June 14, 1960   F. G. STEELE   2,940,171
ANGLE MEASUREMENT
Filed Nov. 5, 1948   4 Sheets-Sheet 1
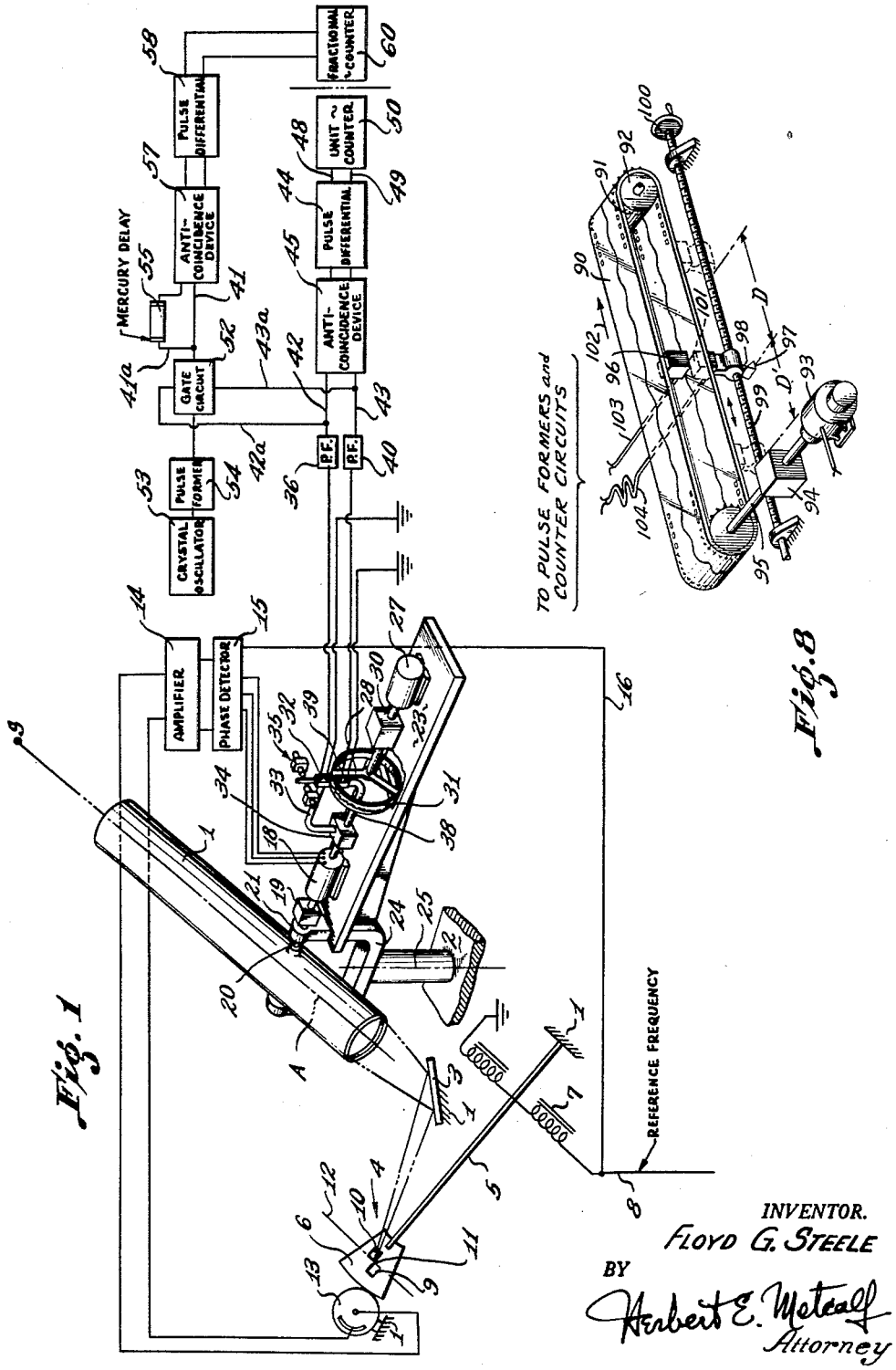
INVENTOR.
FLOYD G. STEELE
BY
Herbert E. Metcalf
Attorney June 14, 1960 F. G. STEELE 2,940,171
ANGLE MEASUREMENT
Filed Nov. 5, 1948 4 Sheets-Sheet 2
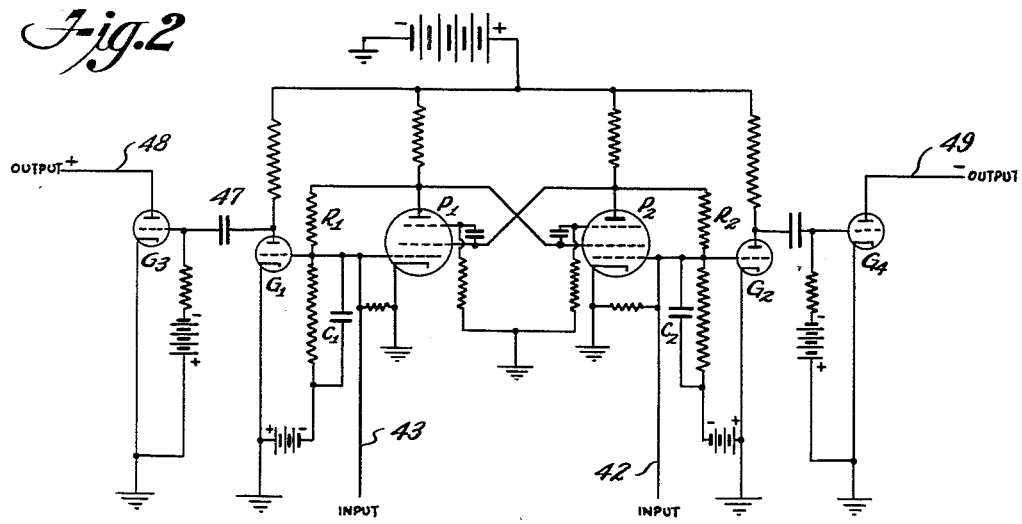
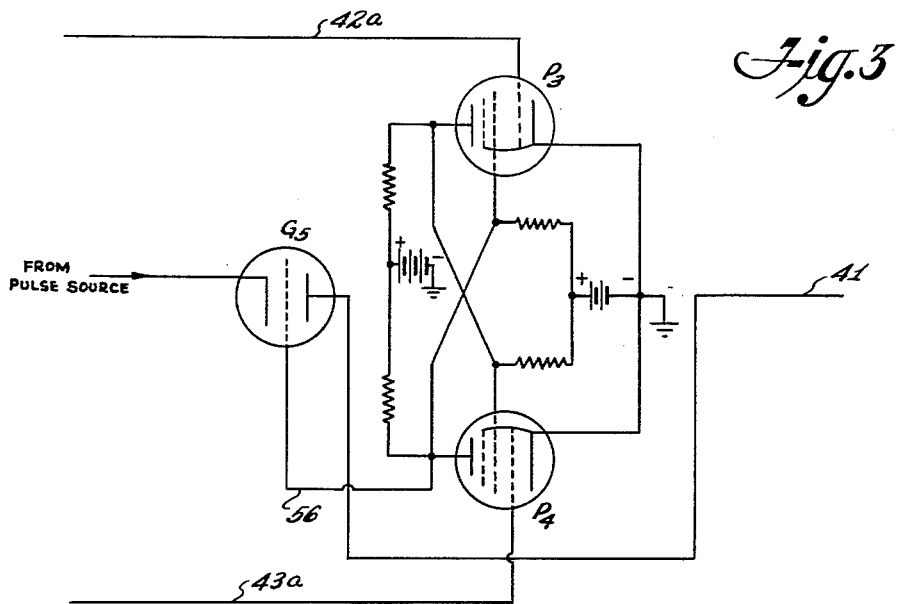
INVENTOR.
FLOYD G. STEELE
BY
Herbert E. Metcalf
Attorney June 14, 1960  F. G. STEELE  2,940,171
ANGLE MEASUREMENT
Filed Nov. 5, 1948  4 Sheets-Sheet 3

INVENTOR.
FLOYD G. STEELE
BY
Herbert E. Metcalf
Attorney

June 14, 1960    F. G. STEELE    2,940,171
ANGLE MEASUREMENT

Filed Nov. 5, 1948    4 Sheets-Sheet 4

INVENTOR.
FLOYD G. STEELE
BY
Herbert E. Metcalf
Attorney

United States Patent Office

2,940,171
Patented June 14, 1960

2,940,171

ANGLE MEASUREMENT

Floyd G. Steele, Long Beach, Calif., assignor to Northrop Corporation, a corporation of California Filed Nov. 5, 1948, Ser. No. 58,493

11 Claims. (Cl. 33—1)

The present invention relates to angle measurement, and more particularly to a means for accurately measuring angular motion of a shaft, for example.

A star tracking system utilized, for example, in conjunction with the automatic celestial navigation of vehicles, such as aircraft, will be presented as a preferred method of practicing the invention. The observations of celestial navigation are measurements of angles between lines. These lines intersect at the observer's point. They must be laid down at the observer's point in such a way that he can measure off the angle from one to the other.

In such a system, one of the required lines, the line to the star is established automatically by a telescope focusing the light from the star into an image deviation detector such as a scanner and a photocell, in order that the detector be able to detect a slight movement of the image away from the control point. The detector output is then used to initiate operation of a servo system attached to the telescope, to return the tracking axis to star sight line alinement, thereby centering the image again on the control point.

By mounting the star tracking equipment on a platform which is the phantom of a gyroscope with axis nearly in the apparent average plumb line, an artificial horizon is available against which, a second required line, the line of bearing to the star, can be laid down. Thus, when the altitude angle, one of the angles required for celestial navigation, which is the angle from the line of bearing of the star to the star line, has been established at the navigator by phantoms under ancillary power and non-interfering detectors, the problem is reduced to one of measuring off this angle with sufficient accuracy. The invention which is to be described present a novel means for accurately measuring this angle.

In general, all measuring devices are limited in their accuracy by some inherent property of the device. Measurement by comparison is limited in accuracy by the width of a printed mark, or an etched or scratched line, or by the inability of the eye to accurately match two lines, for example. Expansion and contraction of the measuring standard, and the granular structure thereof (as in photographic film) all contribute to the error magnitude. Optical measurement is also limited in accuracy by the wave length of the light used and by imperfections or graininess in the screens, lenses, mirrors, etc. forming a part of the optical system.

It is, therefore, an object of the present invention to provide a relatively simple measuring device that eliminates many limits to the accurate measurement of angles, resulting in an extremely accurate angle measuring means.

It is another object of the invention to provide a means for utilizing certain properties of a frequency recording to measure an angle accurately.

In broad terms, I record an endless frequency track and progress the track at substantially a constant speed beneath a reference pickup to provide a reference signal of substantially constant frequency. An angle measuring pickup is then attached to the shaft whose angular rotation is to be measured and placed to be traversed by the rotating track in all rotational positions of the shaft to provide a position signal.

The invention can be more fully understood by reference to the drawings, in which:

Figure 1 is a diagram of a star tracking system utilizing a preferred form of the invention.

Figure 2 is a detailed wiring diagram of the electronic pulse differential.

Figure 3 is a detailed wiring diagram of the gate circuit used in the recording circuit.

Figure 8 is a diagram showing a wave track adapted to be moved along a linear path, and associated pickups capable of linear relative movement used to accurately measure linear distances.

Figure 4:
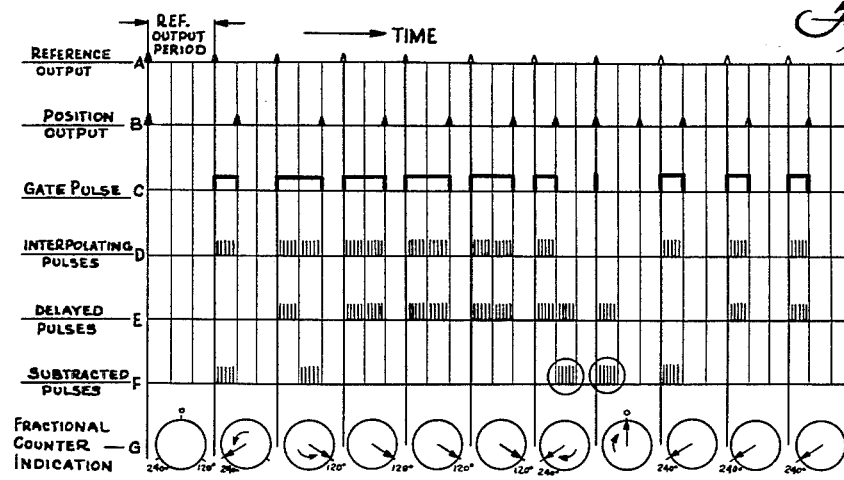
Figure 4 is a chart explaining the operation of the recording circuit of Figure 1.

As shown in Figure 1, a telescope 1 is mounted on a gyro-stabilized platform 2 in a moving vessel, for example, and is pointed in the direction of the light to be sought, such as light from a star S, to make the tracking axis A of the telescope generally coincident with the sight line to the star. The telescope focuses an image of the star onto a light splitter 3 which, in the embodiment illustrated, reflects approximately half of the incident light at substantially a right angle onto an image scanner 4. Scanner 4 is comprised of a small, sector shaped, mostly opaque mask 6 with a flexible scanner rod 5 attached to its inner radial side. Scanner rod 5 is attached to move with the telescope body and is disposed perpendicular to the longitudinal axis thereof. At an intermediate point along the rod an electromagnet 7 is connected to vibrate the mask 6 at a reference frequency in reference frequency line 8, in a plane normal to the image focal plane of the telescope. The plane of the elevation scanner is vertical and the line cut in the mask by a plane normal to the focal image plane of the telescope is called the control line 12 of the scanner. Windows 9 and 10 are cut in the opaque mask above and below the control line 12, respectively. These windows so arranged that the lower right corner of the upper window touches the upper left corner of the lower window. The point where the windows touch is called the control point 11. Directly behind the mask 6 and also attached to move with the body of the telescope is positioned a photoelectric cell 13 which detects the position of the star image with respect to the control line 12.

The output from the photocell 13 is amplified by elevation amplifier 14 and led to an elevation phase detector 15 which is supplied with the same reference frequency as the image scanner 4 through reference frequency line connection 16. Hence, by means well known to the art, energy initiated by photocell 13 response is passed to an elevation motor 18 to cause the rotation in the proper direction through elevation gear box 19 of an elevation drive shaft 20. Elevation drive shaft 20 rests in fork bearing 21 and is rigidly attached to telescope body 1 to produce a change in telescope elevation when rotated. A support 23 for the elevation motor 18 and elevation gear box 19 is rigidly connected to yoke 24 to rotate in conjunction with the telescope about a vertical axis 25.

The particular tracking system just above described is no part of the present invention, being shown, described and claimed in the R. H. Trimble et al. application filed March 14, 1949, Serial No. 81,226, and is shown and described herein merely as being illustrative of a particular device which can utilize to advantage the angle measuring system of the present invention.

The angle measuring system for continuously recording the change in elevation angle of the telescope is also diagrammatically shown in Figure 1.

Here, a motor 27, preferably of a constant speed type, rotates a disc 28 through reduction gear box 30 at, for example, 60 revolutions per minute. Disc 28 is provided with a peripheral cylinder formed from an endless tape 31 capable of having a magnetic recording made thereon.

Above tape 31 a reference magnetic pickup 32 is positioned by a pickup arm 33. Arm 33 is rigidly attached at, for example, the housing of reduction gear box 34 to move with support 23. Reference magnetic pickup 32 is provided with an arcuate adjustment 35. Closely inside tape 31 and mounted on a position shaft 38 to rotate concentrically with the disc 28 and tape 31 is a position pickup 39. Position shaft 38 is driven through gear box 34 by the elevation motor 18 of the telescope 1.

A periodic wave, such as a sinusoidal wave, or the like, is magnetically recorded as a track on tape 31 in a position to actuate both pickups. This track should be endless and have a perfect closure. The frequency of the recorded wave should be sufficiently high to divide the arc of rotation of the track into ten thousand magnetic sectors, for example, with one thousand cycles per inch. Thus, a small disc, about 3 inches in diameter, with such a track thereon can be compared with a gear with ten thousand magnetic teeth thereon.

In operation, as the constant speed disc 28 rotates, sinusoidal waves are induced in the pickups 32 and 39 by the magnetically recorded track. For the position of coincidence both pickups sense the same number of cycles. However, when position pickup 39 is moved with position shaft 38 away from reference pickup 32, cycles are recorded on the position pickup at a higher or lower rate. A higher rate of cycle recordings if the change is in the direction of an increasing angle, or a lower rate if the change is in the direction of a decreasing angle. Conventional negative pulse forming circuits 36 and 40 are connected to the reference pickup 32 and position pickup 39, respectively. These pulse formers form one pulse for each cycle of the wave generated in the pickup and furthermore form the pulse at the same point of each cycle. To ensure that the resulting negative pulses fed through reference and position input lines 42 and 43, respectively, do not enter simultaneously into an electronic pulse differential 44, a pulse anticoincident device 45 is placed in the lines previous to input.

The electronic pulse differential 44, as shown in Figure 2, consists of two pentode tubes $P_1$ and $P_2$ which form an electron coupled flip-flop, i.e., a circuit with two stable states. The stable states correspond to the conditions when one pentode or the other is conducting, both tubes cannot conduct together. A pulse applied to the flip-flop will flip it from one stable condition to the other; for this embodiment of the invention the circuit has the property that the change depends on the input lines 42 and 43 carrying negative pulses.

Triode tubes, referred to as sensing gates $G_1$ and $G_2$, are connected with the flip-flop circuit in such a manner that their grids are controlled by the plate potentials of pentodes $P_1$ and $P_2$, respectively. Assume the pentode $P_2$ is conducting, its plate has a low potential which, since it is connected to the grid bias circuit of gate $G_2$, holds the grid of $G_2$ below cut-off. For this same state of the flip-flop, pentode $P_1$ is not conducting, consequently its plate has a high potential which when connected, as in this embodiment of the invention, to the grid bias circuit of gate $G_1$, holds the grid of $G_1$ well above cut-off so that $G_1$ conducts.

Assume that position input line 43 has a higher rate of negative pulses than reference input line 42 into the electronic pulse differential 44. For the state of the flip-flop described above, negative pulses applied through position head input line 43 to the grid of $G_1$ decrease the current flow through $G_1$ and increase the plate potential of $G_1$. This increase of positive potential on input coupling condenser 47 connecting the plate of $G_1$ to the bias circuit of output gate $G_3$ momentarily holds the grid of $G_3$ above cut-off to pass signal pulses to positive output line 48.

When a negative pulse is applied to the reference input line 42, pentode $P_2$ becomes nonconducting and pentode $P_1$ becomes conducting. The plate potential of $P_2$ now is at the high supply potential; but the grid bias circuit of $G_2$ connected thereto continues to hold the grid of $G_2$ below cut-off because of the delay characteristics incorporated in $R_2C_2$. Thus, the negative pulse in reference input line 42 is not sensed in the negative output line 49.

When this latter negative pulse in the low rate reference input lead 42 flipped the flip-flop, pentode $P_1$ became conductive. However, the low positive potential on the plate of $P_1$ is prevented from instantly appearing on the grid of $G_1$ by the $R_1C_1$ delay characteristic. Hence, although the plate of $G_1$ gradually becomes more positive, the timing of the grid circuit of $G_3$ is such that no signal is passed to positive output lead 48.

The next negative input pulse must be in position input lead 43 since the pulse rate is higher in that lead. This pulse will flip the pentodes back into the original state, but the grid of $G_1$ is now of low potential so that it is below cut-off or at least sufficiently low so that the increase in plate potential of $G_1$ is not enough to cause $G_3$ to conduct. The next negative input pulse, if in position input lead 43, will be passed through $G_3$, however, because since the occurrence of the previous pulse the grid of $G_1$ has had time to become sufficiently positive.

Hence, every pulse in reference input lead 42 prevents one pulse in position input lead 43 from appearing at positive output lead 48. During this operation no pulses have appeared a negative output lead 49; but, if the higher pulse rate shifts to the opposite input lead 42, i.e., the reference input lead, the situation will reverse and the difference will appear only in the negative output line 49. The output lines 48 and 49 are designated as positive and negative leads, respectively, since they are connected so as to indicate whether the telescope elevation angle sensed is increasing or decreasing.

The pulses appearing in output leads 48 and 49 are thus fed to an electronic unit cycle counter 50 which, as one count is made in the electronic counter for every 360° change of the magnetic sine wave recording on disc 28, will measure the angle through which the position shaft 38 has moved, as the position pickup 39 is moved with position shaft 38 away from, or toward, the coincidence position. The unit cycle counter 50 sums the incremental differences in phase between the wave form picked up by the reference pickup and the position pickup to give the total angular displacement between them within one cycle, additively if the change is in the direction of an increasing angle or subtractively if in the other direction. Thus, the number of counts shown in in the counter is a direct measurement within one cycle of the angle through which the position shaft 38 has been moved, as no counts are made when both pickups are stationary.

With 10,000 cycles on the track the unit cycle counter 50 will read the angle change to about two minutes of arc. However, an associated parallel circuit, also controlled by the pulse output of the reference and position pickups is provided which can sense phase relations of the pulses in the pickups to one part in one hundred and twenty. Consequently, the associated circuit, which is to be described, operates a fractional cycle counter 60 which, when read in conjunction with the unit cycle counter 50 before and after position shaft 38 movement, will provide an absolute accuracy of altitude angle measurement to one second of arc.

Referring to Figures 1 and 3, the negative pulse outputs of the reference and position pickups are led to the parallel gate circuit 52 by lines 42a and 43a, respectively.

Gate circuit 52 is comprised of a conventional flip-flop which is a two tube electronic circuit with two stable states. The flip-flop action is that of an electronic double throw switch wherein the switching is done by pulsing the circuit. Pentodes $P_3$ and $P_4$ of the flip-flop have their plates connected to the screen grids of the opposite tubes. Referring to Figure 3, the top pentode $P_3$, as shown, has its control grid connected to receive the negative pulses in line 42a generated by the reference pickup 32 while the lower pentode $P_4$ has its control grid connected to receive the negative pulses in line 43a generated by the position pickup 39. Thus, during the time the lower pentode $P_4$ is not conducting, the high positive potential on its plate, referred to as a gate pulse, is felt at the grid of the gate tube $G_5$ by line connection 56. The cathode of gate tube $G_5$ is connected to a source of pulses comprised of a crystal oscillator 53 and a pulse forming circuit 54. The frequency of generation of these pulses is set to give 120 interpolating pulses in the fixed period determined by the spacing of the pulses in the reference pickup line 42.

Referring to Figure 4, the chart shown explains the operation of the fractional cycle circuit and counter. Row A shows the reference output pulses generated at fixed periodic intervals. Row B shows the position output pulses generated at a faster or slower rate depending on whether the rotation of the position pickup is in the direction of an increasing or decreasing angular change. By letting the reference pickup pulse open and the position pickup pulse close the gate $G_5$ for a duration of the cycle period, referred to as the gate pulse and represented by row C, the number of interpolating pulses emitted from the pulse source, shown in row D of Figure 4, corresponds to the phase position of the position pickup pulse in the fixed period of the reference pickup pulse. The interpolating pulses passed through the gate $G_5$ for the fractional part of the reference pulse period are sent through gate output line 41 and also in a parallel circuit 41a containing a mercury delay 55 which delays the interpolating pulses for a period equal to the fixed period between the reference pickup pulses, as shown in row E. The interpolating pulses of the currently occurring period are then matched against the delayed interpolating pulses of the preceding period, by passing both sets of interpolating pulses through a second anti-coincidence device 57 and a second electronic pulse differential 58 of the previously described type. The resulting interpolating pulses, shown in row F, are passed on to the fractional cycle counter 60; the countings therein, representing the desired phase position, is schematically shown in row G. If the number of delayed interpolating pulses carried over into the next period are greater than the interpolating pulses emitted during that period, the subtracted pulses act to give the complement of the phase relation in the fractional cycle counter 60. This point may be further clarified by referring to the schematic representation of the electronic counter in row G of Figure 4 and noting that the counter is shown divided into markings up to 360° representing one magnetic cycle of the track. When the number of interpolating pulses of the currently occurring period are greater than the number of delayed interpolating pulses of the preceding period the subtracted pulses are such as to record the incremental change on the counter in a counterclockwise direction. If the number of delayed pulses are greater than the interpolating pulses for any period the subtracted pulses are such as to record the incremental change in a clockwise direction. Thus, each incremental phase change in position of the position pickup pulse with respect to the reference pickup pulse period is recorded on fractional cycle counter 60.

It should be pointed out that the circuit for the fractional cycle counter may, for an instant, give an erroneous result as shown when two position output pulses appear within one period of the reference output, and only the phase position of the first position pulse in the period is recorded. From a practical point of view, however, the error is instantly corrected in the next period and is of no consequence.

After a change in angular movement of the telescope 1 has been completed, the electronic fractional counter will not receive any interpolating pulses since the periods of the pulses generated in both pickups is the same and consequently the phase position of the pulses does not change, i.e., the interpolating pulses for each period are just equal to the delayed pulses of the preceding period.

Figure 5:
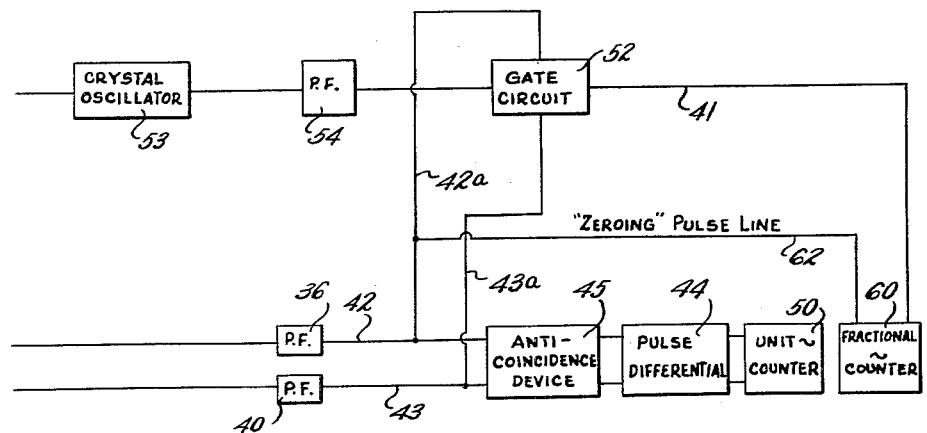
Figure 5 is a block diagram of a modified form of the recording circuit.

Another circuit for recording the fractional phase position of the position pulse in the period of the reference pulses is shown in Figure 5 wherein like notation is used for parts identical with the preferred circuit shown in Figure 1. As before, the gate circuit 52 permits interpolating pulses to pass corresponding to the fractional phase position of the position pulse in the fixed period of the reference pulse. Instead of making use of a delay device to match the interpolating pulses of the currently occurring period with the preceding period, however, to give the incremental change, each pulse from the reference pickup 32 is carried by lead 62 to the fraction counter 60 to reset the fraction counter to zero. This circuit has the advantage of being less dependent on the reference pickup pulses occurring at fixed periods within the accuracy of the interpolating pulses but has the problem of requiring an extremely fast acting electronic counter resetting itself periodically with each reference pulse.

Another method of measuring the angle with the above described apparatus is performed where the pickups 32 and 39 are not initially in coincidence within one magnetic cycle but are displaced through a certain established angle of the disc. Therefore, the angle measured will be equal to the angular movement of the position pickup from the initial setting of the new setting.

The initial angle must be established within the accuracy of the device. This is done, for example, by superimposing a sharp magnetic pulse on the initial recording, and connecting a cycle counter so that it is turned on when the pulse passes the reference pickup 32 and turned off when the pulse passes position pickup 39. The angle between pickups 32 and 39 is thus determined accurately, since the total number of cycles on the track has previously been determined and the phase position of the pulses from the two pickups within one cycle can be observed from the fractional cycle counter 60 before and after counting. After the initial setting has been measured, changes in angular position of position shaft 38 are measured accurately as before by the number of unit cycle counts and by the number of fractional cycle counts before and after position shaft rotation.

It is to be noted that changes in physical dimensions of the disc and tape such as might be caused by uneven temperature expansions, errors due to bearing play or the like, are introduced to the output only as oscillating errors at the disc rotation frequency. Thus, when the disc is turning at a constant rate, these oscillations, having a frequency greatly differing from track frequency can be filtered out, and do not affect accuracy of measurement. It is also to be noted that the angle is measured directly, and the accuracy is not dependent on the size of the angle to be measured within the limits of accuracy of the device.

Figure 6:
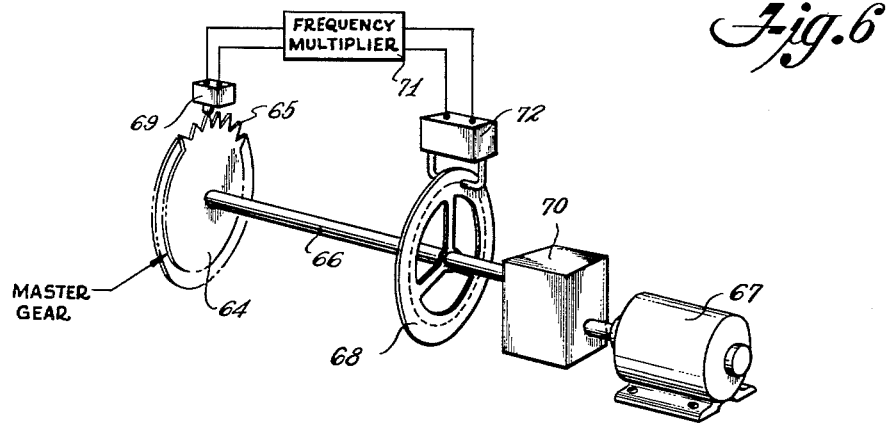
Figure 6 shows one method of recording the frequency track.

One way of recording an accurately closed track is shown in Figure 6. An accurately cut master gear 64 with relatively few teeth 65 of magnetic material thereon is rotated by shaft 66 driven through gear box 70 by a constant speed motor 67. A record disc 68 is also rotated by shaft 66. A master gear magnetic pickup 69 is positioned to be magnetically influenced by rotation of teeth 65 to form a signal frequency corresponding to gear rotation and number of teeth thereon, as is well known in the art. The gear frequency is then passed through a frequency multiplier 71 and the multiplied frequency magnetically recorded by recording head 72 on record disc 68. Record disc 68 can then be used if desired in place of gear 64 and a still higher frequency recorded on a second record disc. In either case, once one accurately closed track has been obtained, it can, when used as a master record, be utilized to record closed tracks on other discs turned with it, and these other discs can be of any size.

Figure 7:
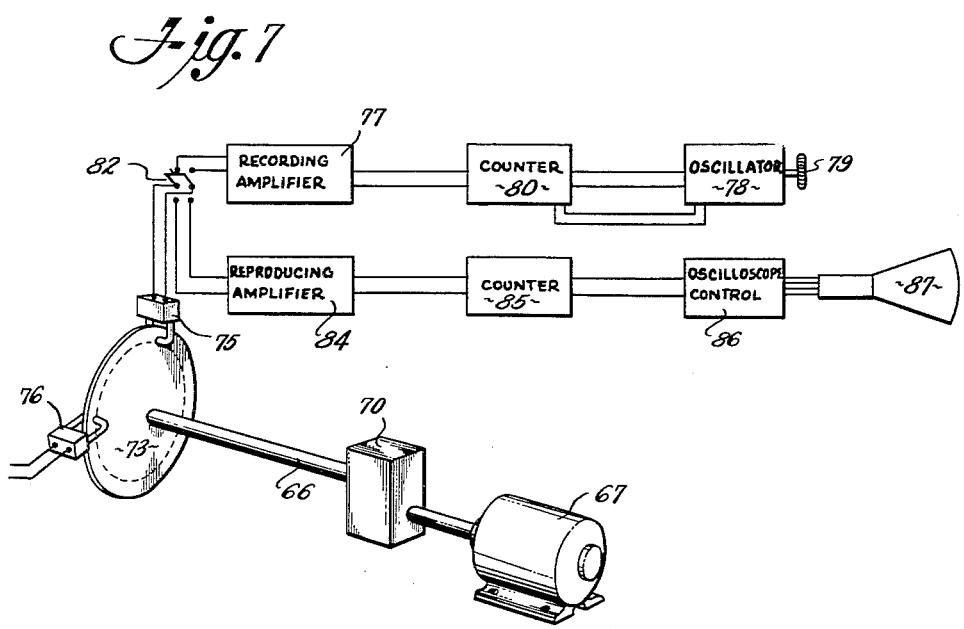
Figure 7 shows another method of recording the frequency track.

Another way of recording a closed track without making accurate master gear 64 is to record the track by trial and error directly on a master disc. A system for making a track in this manner is shown in Figure 7.

Here, the master disc 73 is mounted on the shaft 66, rotated through gear box 70 by constant speed motor 67. A recording and reproducing head 75 is placed to act on disc 73, as is also an erasing head 76.

Recording and reproducing head 75 is energized as a recorder by recording amplifier 77 receiving signals, for example, from oscillator 78 which is adjusted by knob 79 to oscillate at a frequency which will, for example, record 10,000 cycles on the complete track traversed by the recording head 75 in one revolution of disc 73. It is thus noted that oscillator 78 should be synchronized with the same power that drives motor 67. A cycle counter 80 is placed between oscillator 78 and recording amplifier 77 and is set to pass exactly ten thousand cycles and then block and shut off oscillator 78. Head 75 is then used as a reproducing head, and is connected by a two-way switch 82 to a reproducing amplifier 84 fed through a second cycle counter 85 to an oscilloscope control 86, energizing an oscilloscope 87. Second cycle counter 85 is set to place cycles numbers 1 and 10,000 on the screen of oscilloscope 87 so that incomplete closure or overlap can be seen. If not correct, the track is erased by use of erasing head 76. Erasing head 76 is connected to an ultra audio oscillator (not shown) through a hand controlled switch. It is turned on momentarily whenever it is decided to clear the disc 73. The oscillator 78 is then raised or lowered in frequency as the case may be, and a new recording is made, with subsequent closure examination. With careful frequency adjustment of oscillator 78 an accurate closure is readily obtained after a few trials. As before, once a closed track has been accomplished, the master disc 73 can be utilized to record as many others as may be desired.

Although the embodiment of the invention as illustrated and described herein shows apparatus for measuring an angle and thus utilizes a rotary track, it should be understood that an endless linear track with appropriately positioned pickups could be used to accurately measure linear distances.

Figure 8 illustrates a one-way arrangement whereby linear distances can be accurately measured utilizing the present invention.

Referring to Figure 8, an endless linear tape 90 having a magnetic wave track recording made thereon is moved at a substantially constant speed by sprockets 91 of drum 92 which is in turn driven by a constant speed motor 93. Motor 93 can be either A.C. or D.C. and acts through reduction gear box 94 to turn shaft 95, thus motivating the drum 92 at a uniform speed. Stationary reference magnetic pickup 96 is located closely above lower loop section of tape 90 and directly in line with central index marker 97. A pointer 98 travels along lead screw 99 which can be rotated by hand wheel 100, manually operated, for example, to move the pointer 98 linearly. Immediately above and in line with pointer 98 is a position magnetic pickup 101 rigidly attached thereto and maintained closely to the tape track 90 when traveling along the lead screw 99. By driving the tape 90 in the direction indicated by the arrow 102, for example, and connecting stationary reference magnetic pickup leads 103 and position magnetic pickup leads 104 to respective pulse formers and the counter circuits shown and described in Figure 1, linear distances D or D' can be easily determined with this device in the same manner as previously explained for that of Figure 1, a variation being that the counters are now calibrated in linear terms of length and fractions thereof.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. In an angle measurement device, a member adapted to be rotated, a circular endless and accurately closed periodic wave track rotatable with said member, a first pickup positioned to be energized by said track, a second pickup positioned to be energized by said track, said pickups being relatively movable, means for rotating said member to create output waves in said pickups, pulse forming circuit means connected with each of said pickups, means responsive to the output pulses of said pulse forming circuit means for indicating the numerical difference of said output pulses resulting from relative movements of said pickups.

2. In an angle measurement device, a member adapted to be rotated, a circular endless and accurately closed periodic wave track rotatable with said member, a first pickup positioned to be energized by said track, a second pickup positioned to be energized by said track, means for rotating said member to create output signals in said pickups, means responsive to said signals for indicating the numerical difference of said output signals resulting from relative movements of said pickups wherein one of said pickups is stationary and the other is movable over an angle to be measured.

3. In an angle measurement device, a member adapted to be rotated, a circular endless and accurately closed periodic wave track rotatable with said member, a first pickup position to be energized by said track, a second pickup positioned to be energized by said track, said pickups being arranged so that one is stationary and the other is movable over an angle to be measured, means for rotating said member at substantially a constant speed to create output waves in said pickups, pulse forming circuit means connected with each of said pickups thereby producing output pulses of a fixed period from said pulse forming circuit means connected to said stationary pickup and output pulses of varying period from said pulse forming circuit means connected to said moving pickup, means responsive to said output pulses of said pulse forming circuit means for indicating the numerical difference of said output pulses resulting from relative movement of said pickups, and means for simultaneously indicating the phase position of each said output pulse associated with said moving pickup in said fixed period of said output pulses associated with said stationary pickup.

4. In an angle measurement device, a member adapted to be rotated, a circular endless and accurately closed periodic wave track rotatable with said member, a first pickup positioned to be energized by said track, a second pickup positioned to be energized by said track, said pickups being relatively movable, means for rotating said member to create output waves in said pickups, pulse circuit forming means connected with each of said pickups, means responsive to the output pulses of said pulse forming circuit means for indicating the numerical difference of said output pulses resulting from relative movements of said pickups, and wherein said periodic wave track contains a predetermined and known number of complete cycles.

5. In an angle measurement device, a member adapted to be rotated, a circular endless and accurately closed periodic wave track rotatable with said member, a first pickup positioned to be energized by said track, a second pickup positioned to be energized by said track, said pickups being relatively movable, means for rotating said member to create output signals in said pickups, and means responsive to said signals for indicating the numerical difference of said output signals resulting from relative movements of said pickups, and wherein said pickups have an initial reference position before relative movement responsive to the same cycle of said wave.

6. In an angle measurement device, a member adapted to be rotated, a circular endless and accurately closed periodic wave track rotatable with said member, a first pickup positioned to be energized by said track, a second pickup positioned to be energized by said track, said pickups being relatively movable, means for rotating said member to create output signals in said pickups, and means responsive to said signals for indicating the numerical difference of said output signals resulting from relative movements of said pickups, and wherein said pickups are separated by a distance corresponding to a known number of cycles before relative movement thereof.

7. In a measuring device, means having an endless and accurately closed periodic wave track adapted to be moved along a linear path, a first pickup positioned to be energized by said track, a second pickup positioned to be energized by said track, said pickups being relatively movable, means for moving said track along said path at substantially a constant speed to create output waves in said pickups, pulse circuit forming means connected with each of said pickups, means responsive to the output pulses of said pulse forming circuit means for indicating the numerical difference of said output pulses resulting from linear relative movement of said pickups.

8. In an angle measuring device, a member adapted to be rotated, a circular endless and accurately closed periodic wave track rotatable with said member, a first pickup positioned to be energized by said track, a second pickup positioned to be energized by said track, a shaft whose angular rotation is to be measured, said pickups being arranged so that said first pickup is stationary and said second pickup is movable with said shaft, means for rotating said member at a substantially constant speed to create output waves in said pickups, output leads from each of said pickups, pulse forming circuits in each of said output leads, means for subtracting the pulses in one of said output leads from the pulses in the other of said output leads, a unit cycle counter for indicating the difference of said pulses resulting from the relative movement of said pickups, parallel leads connected to said output leads carrying said pulses, a gate, an electronic flip-flop circuit acting like a double throw switch controlling said gate, said electronic flip-flop switched by said pulses, said stationary pickup pulses periodically opening said gate, said movable pickup pulses closing said gate, a source of interpolating pulses, said interpolating pulses passing through said gate when said gate is open, an interpolating pulse output lead, a shunt lead connected to said output lead, a mercury delay in said shunt lead wherein said interpolating pulses for the currently occurring periodic emission are delayed for a fixed period equal to the timing of the pulses associated with the stationary pickup, a means for subtracting the interpolating pulses in said interpolating pulse output lead from the delayed pulses in said shunt lead, a fractional counter for indicating the phase position of said moving pickup pulse in the fixed period of said stationary pickup pulse by the number of interpolating pulses summed thereon.

9. Apparatus in accordance with claim 8 wherein the frequency of said interpolating pulses is such as to give 120 pulses in the fixed period of said stationary pickup pulses.

10. In an angle measuring device, a rotatable member of uniform magnetic composition magnetized over a circular path to provide a cardinal number of complete magnetic cycles of the same wave length, means for rotating said member at substantially a constant speed, a first pickup coil positioned for reproducing said magnetic cycles as an electrical signal, a second pickup coil positioned for reproducing said magnetic cycles as an electrical signal, said pickup coils being arranged so that one is stationary and the other is movable over an angle to be measured, output leads from each of said output coils, pulse forming circuits in each of said output leads, a pulse differential circuit connected to said output leads, a pulse anticoincident device connected to said output leads previous to said pulse differential circuit, a unit cycle counter for summing the pulse output from said pulse differential circuit, said unit counter indicating the magnitude and direction of the relative movements of said pickup coils.

11. In an angle measurement device, a member adapted to be rotated, a circular endless and accurately closed periodic wave track rotatable with said member, a first pickup positioned to be energized by said track, a second pickup positioned to be energized by said track, a shaft whose angular rotation is to be measured, said pickups being arranged so that said first pickup is stationary and said second pickup is movable with said shaft, means for rotating said member at a substantially constant speed to create output waves in said pickups, output leads from each of said pickups, pulse forming circuits in each of said output leads, means for subtracting the pulses in one of said output leads from the pulses in the other of said output leads, a unit cycle counter for indicating the difference of said pulses resulting from the relative movements of said pickups, parallel leads connected to said output leads carrying said pulses, a gate, an electronic flip-flop acting like a double throw switch controlling said gate, said electronic flip-flop switched by said pulses, said stationary pickup pulses periodically opening said gate, said movable pickup pulses closing said gate, a source of interpolating pulses, said interpolating pulses passing through said gate when said gate is open, an interpolating pulse output lead, a fractional counter for indicating the number of interpolating pulses for each periodic emission, the sum of said interpolating pulses indicating the phase position of said moving pickup pulse in the fixed period of said stationary pulse, a zeroing pulse lead connecting said stationary pickup pulse forming circuit output with said fractional counter for carrying said stationary pickup pulses to said fractional counter, each of said latter pulses periodically resetting said fractional counter to zero.

References Cited in the file of this patent

UNITED STATES PATENTS

| Number | Name | Date |
|---|---|---|
| 1,280,566 | Sherry et al. | Oct. 1, 1918 |
| 1,941,036 | Lenk | Dec. 26, 1933 |
| 2,028,622 | Phelps | Jan. 21, 1936 |
| 2,144,844 | Hickman | Jan. 24, 1939 |
| 2,243,730 | Ellis | May 27, 1941 |
| 2,251,040 | Dewees | July 29, 1941 |
| 2,370,134 | Begun | Feb. 27, 1945 |
| 2,370,166 | Hooven | Feb. 27, 1945 |
| 2,370,176 | Kornei | Feb. 27, 1945 |
| 2,437,242 | Cole et al. | Mar. 9, 1948 |
| 2,439,446 | Begun | Apr. 13, 1948 |